United States Patent
Hjelmsmark

(10) Patent No.: US 11,273,411 B2
(45) Date of Patent: Mar. 15, 2022

(54) VIBRATING FILTER-PLATE ASSEMBLY DEVICE

(71) Applicant: Sani Membranes ApS, Allerød (DK)

(72) Inventor: Henrik Hjelmsmark, Værløse (DK)

(73) Assignee: Sani Membranes ApS, Allerød (DK)

( * ) Notice: Subject to any disclaimer, the term of this patent is extended or adjusted under 35 U.S.C. 154(b) by 272 days.

(21) Appl. No.: 16/482,975

(22) PCT Filed: Feb. 7, 2018

(86) PCT No.: PCT/DK2018/050028
§ 371 (c)(1),
(2) Date: Aug. 2, 2019

(87) PCT Pub. No.: WO2018/145714
PCT Pub. Date: Aug. 16, 2018

(65) Prior Publication Data
US 2021/0275969 A1  Sep. 9, 2021

(30) Foreign Application Priority Data
Feb. 10, 2017 (DK) .............................. PA201770092

(51) Int. Cl.
*B01D 61/18* (2006.01)
*B01D 63/08* (2006.01)
*B01D 65/08* (2006.01)

(52) U.S. Cl.
CPC ........... *B01D 61/18* (2013.01); *B01D 63/082* (2013.01); *B01D 65/08* (2013.01); *B01D 2315/04* (2013.01); *B01D 2321/2066* (2013.01)

(58) Field of Classification Search
CPC ...... B01D 61/18; B01D 63/082; B01D 65/08; B01D 2321/2066; B01D 2315/04; B01D 25/346; B01D 35/20; B01D 61/16; B01D 63/08–088; B01D 29/0061;
(Continued)

(56) References Cited

U.S. PATENT DOCUMENTS

| 4,124,488 A | 11/1978 | Wilson |
| 6,322,698 B1 | 11/2001 | Rios |

(Continued)

FOREIGN PATENT DOCUMENTS

| CN | 203507822 U | 4/2014 |
| CN | 103846211 A | 6/2014 |

(Continued)

OTHER PUBLICATIONS

International Search Report and Written Opinion of International Searching Authority for Application No. PCT/DK2018/050028, dated Mar. 26, 2018 (11 pages).

*Primary Examiner* — Pranav N Patel
(74) *Attorney, Agent, or Firm* — Nixon Peabody LLP

(57) ABSTRACT

A vibrating device for a filter-plate assembly for liquid filtration having a vessel housing for the filter-plate assembly and one or more flexible volume chambers being filled with gas. The volume chambers are adapted to expand and/or compress the volumes of the chambers inside the vessel housing allowing the liquid in the vessel chamber to move relative to the surface of the filter-plates when the vessel housing including the filter-plate assembly is subjected to a vibrating motion.

16 Claims, 5 Drawing Sheets

(58) Field of Classification Search
CPC .... B01D 29/0086; B01D 29/72; B01D 33/03; B01D 33/54
See application file for complete search history.

(56) References Cited

U.S. PATENT DOCUMENTS

| | | | |
|---|---|---|---|
| 2005/0023219 A1* | 2/2005 | Kirker | B01D 63/10 210/636 |
| 2013/0193076 A1 | 8/2013 | Wesselmann | |
| 2015/0247114 A1* | 9/2015 | Gebauer | F04B 53/20 435/243 |
| 2016/0089636 A1 | 3/2016 | Wiemers | |

FOREIGN PATENT DOCUMENTS

| | | |
|---|---|---|
| CN | 204544009 U | 8/2015 |
| CN | 105709602 A | 6/2016 |
| DE | 10 2006 020049 A1 | 10/2007 |
| DE | 10 2006 040451 A1 | 2/2008 |
| EP | 1017483 B1 | 7/2002 |
| WO | WO 2005/011833 A2 | 2/2005 |
| WO | WO 2015/114141 A1 | 8/2015 |
| WO | WO 2015/198080 A1 | 12/2015 |

* cited by examiner

VIBRATING FILTER-PLATE ASSEMBLY DEVICE

CROSS-REFERENCE TO RELATED APPLICATIONS

This application is a U.S. National Stage of International Application No. PCT/DK2018/050028, filed Jul. 2, 2018, which claims the benefit of Denmark Patent Application No. PA201770092, filed Feb. 10, 2017, both of which are incorporated herein by reference in their entireties.

FIELD OF THE INVENTION

The present invention relates to a vibrating device adapted for vibration of a filter-plate assembly, the filter-plate assembly being adapted for continuous vibration-driven filtration. Said vibration device comprises a vessel housing which comprises a vessel pressure chamber, and said vibration device further comprises a filter-plate assembly which comprises a plurality of rigid, planar, preferably rectangular filter-plates, said filter-plates comprising one or more permeate channels and one or more permeate exits, where said one or more permeate exits may extend perpendicularly to the filter-plate assembly through said vessel housing being adapted for permeate to exit the vessel housing, and said filter-plate assembly is being rigidly mounted inside said vessel pressure chamber. Said vibrating filter-plate assembly device having at least one retentate inlet adapted for a retentate stream to enter the vessel housing and at least one retentate outlet adapted for a retentate stream to exit the vessel housing. Said vibrating device being further comprising a vibration motor, and said vibration motor being adapted to provide a vibrating motion to the vessel housing.

The vibrating filter-plate assembly device of the invention is useful for operations, such as fine filtration, microfiltration and ultrafiltration of liquids using filter-plates optionally mounted with semipermeable membranes, where the filter-plates are typically subjected to a tangential flow. The vibrating device is useful in operations where a robust, possibly sanitary and fouling preventing filtration is desirable. The vibrating device is capable of being configured to filtering operations, such as from 50 µm filtering down to microfiltration and ultrafiltration.

DESCRIPTION OF THE PRIOR ART

The efficiency of a filter surface in form of flux per square meter is often not very high, as optimal flux is only obtained in a hydrodynamic homogeneous configuration, with a clean membrane and where concentration polarization of media close to the filter surface is avoided.

A submerged device (CN105709602(A)) is described as an axial vibrating flat sheet membrane, and this invention achieves a high flux from vibrating movement of flat filter-plate relative to the media to be filtered. The media is situated in a fixed open vessel and it is understood that the filter-plates can move freely while the media is still. The invention is mechanically complicated and will be difficult to pressurize or even to keep the system closed. Controlling concentration can also be problematic as flow to the membrane surface is not controlled in the open vessel.

Round discs vibrating around a central axe is, i.a., described in CN204544009 or CN203507822. These are efficient vibrating systems allowing high shear of membrane to media, however the complex construction has a tendency to break down and additionally the initial cost of device is high.

U.S. Pat. No. 6,322,698 discloses a vibratory separation system comprising a membrane module including an axis and a plurality of stacked filter elements, where a vibratory drive mechanism is coupled to the membrane module for imparting vibratory motion to the filter elements wherein the direction of vibration is in a plane perpendicular to the axis of the membrane module. Said system has relatively high energy requirements for power transmission, such as a vibratory drive mechanism including a torsional element coupled to the membrane module which is forced to vibrate inside a rigid housing. Thus, very robust or stiff filter elements, such as ceramic filter elements, are preferred.

WO2015114141 discloses a filter-plate assembly configured for cross-flow filtration, an embodiment is illustrated in FIG. 5. This filter-plate assembly comprises a plurality of plastic molded planar rectangular filter-plates (3) and one or more permeate exits (4), where the filter-plates comprise a first and a second rigid surface, the surfaces comprising perforations (31), the surfaces enclosing a volume, the volume constituting one or more permeate channels (39), whereby the perforations (31) are fluidly connected to one or more permeate exits (4) through the permeate channels (39), and where the filter-plate exit openings comprise a rim like protrusion, and the protrusions of the plurality of filter-plates combined or stacked form the permeate exits (4) from the filter-plate assembly. In this disclosed technique having cross flow configuration used for filtering of a substantial flow of media, the retentate flux must be maintained at a high level inside the assembly in order to maintain turbulence of flow when a certain cleaning functionality of filter-plates and/or membranes is desired.

DE202006020049 U1 discloses a filter device in which vibration of the housing walls induces oscillation of the liquid medium inside the housing. The liquid medium oscillates between two sections of the housing walls, which consist of flexible gaskets, made from e.g. rubber.

DE 10 2006 040451 A1 discloses a membrane module arrangement comprising a tubular-/hollow fiber-/cushion membrane module through which liquid flows during operation, and an oscillation source. The oscillation produced by the oscillation source has a frequency, which corresponds to the resonant frequency of the oscillation system. The oscillation source produces the oscillation in the auxiliary part of the inflow and/or the permeate. A sensor and a control unit cooperate together for controlling the oscillation source. A formation of a forced oscillation in the oscillation system is avoided through the control unit.

U.S. Pat. No. 4,124,488 A discloses an apparatus for reverse osmosis purification of water or other fluid by passing the fluid under pressure across a membrane, through which membrane a part of the fluid passes in purified form, makes use of a piston or diaphragm pump in which the front face of the piston or diaphragm is used to force the fluid from one end of a cylinder into the module and in which the return fluid is applied to the rear face of the piston or diaphragm so that the pressures on the two faces are substantially balanced. The piston or diaphragm is operated by a piston rod attached to the rear face of the piston or diaphragm; the system is self-regulating to give an extraction ratio equal to the ratio of piston rod area to piston area.

SUMMARY OF THE INVENTION

It is an objective of the present invention to provide a vibrating filter-plate assembly device for filtration separation of a liquid into permeate and retentate having a simple vessel housing construction with optimized free flow filtering capacity, and being capable of maintaining a turbulent layer between filter-plate surface and surrounding liquid media through a relative movement between these, hereby obtaining a high permeate flux in a continuous filtration process.

This is achieved by a vibrating filter-plate assembly device for a filter-plate assembly for liquid filtration comprising a vessel housing for the filter-plate assembly and one or more flexible volume chambers being filled with gas, where the volume chamber(s) is/are adapted to expand and/or compress the volume(s) of the chamber(s) inside the vessel housing allowing the liquid in the vessel chamber to move across the surface of said filter-plates when said vessel housing comprising said filter-plate assembly is subjected to a vibrating motion, where the vibrating device comprises at least one flexible support or suspension, where the vessel housing is supported by said at least one flexible support allowing vibrating motion of the vessel housing.

Thus, the invention relates to a vibrating filter-plate assembly device for filtration separation of a liquid into permeate and retentate, where said device comprises a vessel housing for at least one vessel pressure chamber comprising an assembly of at least one filter-plate(s) and at least one flexible volume chamber being adapted to expand and/or compress allowing the retentate liquid in the vessel pressure chamber to vibrate relative to the surface of said filter-plate (s).

The invention further relates to a vibrating filter-plate assembly device (50) adapted for vibration of a filter-plate assembly (2), the filter-plate assembly (2) being adapted for continuous or discontinuous vibration driven filtration, where said vibrating device (50) comprises a vessel housing (1), said vessel housing (1) comprises a vessel pressure chamber (5) comprising a filter-plate assembly (2), and said filter-plate assembly (2) comprising a plurality of rigid, planar filter-plates (3) comprising one or more permeate channels (39) and one or more permeate exits (4), where said one or more permeate exits (4) extend perpendicular to the filter-plate assembly (2) and through said vessel housing (1) being adapted for the permeate to exit the vessel housing (1), and said filter-plate assembly (2) is rigidly mounted inside said vessel pressure chamber (5); said vibrating device (50) comprises at least one retentate inlet (7) adapted for a retentate stream to enter the vessel housing (1) and at least one retentate outlet (9) adapted for a retentate stream to exit the vessel housing (1), and said vibrating device (50) comprises a vibration motor (11) being adapted to provide a vibrating motion to the vessel housing (1), wherein said vibrating device (50) comprises one or more flexible volume chambers (14, 15) being filled with gas and being adapted to expand and/or compress the volumes of the chambers inside the vessel housing (1) allowing the retentate in the vessel chamber (5) to move in parallel relative to the surface of said filter plates, when said vessel housing (1) comprising said filter-plate assembly (2) is subjected to a vibrating motion. In an embodiment of the invention the direction of the vibrating motion is perpendicular to the flexible volume chambers, e.g. being perpendicular to a longitudinal axis of the flexible volume chambers.

Hereby a simple construction is obtained by the use of a limited number of components and the numerous advantages of the filter-plate assembly can be utilized in a simple energy efficient and cost-efficient device. The energy efficiency is obtained through turbulence in the filtration media created directly at the filter-plate surface or membrane surface, where the turbulence keeps the filter surface from clogging. Thus, energy consumption compared to a typical cross flow filtering device is greatly reduced.

The invention further relates to a vibrating filter-plate assembly device (50) adapted for vibration of a filter plate assembly (2), the filter plate assembly (2) being adapted for continuous vibration driven filtration, where said vibration device (50) comprises a vessel housing (1), said vessel housing (1) comprises a vessel pressure chamber (5), said vibration device (50) comprises a filter plate assembly (2), said filter plate assembly (2) comprises a plurality of rigid, planar rectangular filter plates (3), said filter plates (3) comprise one or more permeate channels (39) and one or more permeate exits (4), said one or more permeate exits (4) extend perpendicular to the filter plate assembly (2) through said vessel housing (1) adapted for permeate to exit the vessel housing (1), said filter plate assembly (2) is rigidly mounted inside said vessel pressure chamber (5), said vibrating device (50) comprises at least one retentate inlet (7) adapted for a retentate stream to enter the vessel housing (1) and at least one retentate outlet (9) adapted for a retentate stream to exit the vessel housing (1), said vibrating device (50) comprises a vibration motor (11), said vibration motor (11) is adapted to provide a vibrating motion to the vessel housing (1), characterized in that said vibrating device (50) comprises one or more flexible volume chambers (14, 15), said one or more flexible volume chambers (14, 15) being filled with gas, said one or more flexible volume chambers (14, 15) adapted to expand and/or compress the volumes of the chambers inside the vessel housing (1) allowing the retentate in the vessel chamber (5) to move in parallel relative to the surface of said filter plates, when said vessel housing (1) comprising said filter plate assembly (2) is subjected to a vibrating motion.

Using the device of the invention the media to be filtered is vibrated relative to the filter surface, and can at the same time pass freely between the filter-plates so that free flow filtration is obtained and the media to be filtered can be highly viscous and even contain large particulate impurities, as long as the media do not blockage the free flow passage between plates. Optimal turbulence is created at the filter/membrane surface by the vibrating motion of the filter-plate assembly relative to the media to be filtered (feed, retentate). The vibrating motion enables low fouling operation and, thus, effective filtration without the need of fast cross-flow to create turbulence at the filter surface in conventional cross-flow filtration.

In addition, an optimized cleaning functionality of filter-plates and or membranes is achieved using the vibrating filter-plate assembly device of the invention by applying movement relative to the filter surface through the media to be filtered, and this relative movement is achieved when the filter-plate assembly is being vibrated and the fluid media has room not to move with the plate. The vibration can hereby keep the filter surface free and clean, maintaining high flux through the membrane in a continuous filtration process. The media to be filtered, the retentate, can be concentrated in the device or continuously pass from inlet to exit while being concentrated.

The vibrating filter-plate assembly device of the invention can be operated as vibration driven continuous filtration with a feed pump feeding in media and continuously discharging of permeate and retentate. The vibrating motion will diminish fouling and create a higher flux than conventional cross flow filtration.

The vibrating device can also be operated as vibration driven dead-end filtration, where the media is concentrated in the retentate chamber and discharged at the end of operations or intermediately.

The vibrating device can also be operated as intermediately vibration driven filtration, where the media is concentrated in the retentate chamber and intermediate vibration action keeps the flux of the filter area at an acceptable high level. The vibrating motion will diminish fouling and create a higher flux than conventional dead-end filtration.

In an embodiment, the vibrating motion of the filter-plate assembly and vessel relative to the media being filtered is achieved through oscillating the air or gas feeds asynchronically to the at least two air cushions whereby the flexible volume chambers function as vibrating motors. One advantage of this embodiment is the use of the air cushions as vibrating motors.

In an embodiment, the feed is entered in one corner of a rectangular filter-plate assembly and concentrate is exited in the opposite corner through suitable fluid connections. An additional de-aeration exit in the upper sider can be used for de-aeration of the vessel. This allows a high concentration to be achieved in a one pass flow. If a uniform retentate is wanted, this can be achieved by circulating concentrate from the previously described exit back to the vessel entry side.

In an embodiment, the filter feed pressure and air cushion pressure are adjusted to be the same, maximizing the efficiency of the air cushions. In all designs caution must be taken to avoid a higher feed pressure than allowed in vessel design.

In an embodiment, the device is cleaned by substituting feed with rinse water or cleaning media, and increasing flow over the filter by circulating the media at high flow rate from inlet to outlet while maintain the rinsing function through vibration.

In an embodiment, the feed is provided by a tank with a gas, such as atmospheric air or nitrogen gas or gaseous mixtures under pressure, and the pressurized gas acts as feed pump, pressing the feed into the filter device. This feed system can provide a stable feed at very low cost and using only simple off the shelf elements.

In an embodiment, the feed is provided by a tank wherein a sterile bag contains the feed media, with air or gas under pressure, and the pressurized gas act as feed pump, pressing the feed into the filter device. This feed system can provide a stable, sterile feed at very low cost and using only simple off the shelf elements.

In an embodiment, the vibrating vessel is formed in see-through materials or with see-through inspection glasses whereby the filter-plate assembly and media can be visually inspected during filtration process and cleaning.

Materials used for the filter-plate assembly device can be selected from polymeric or co-polymeric thermoplastics or any other suitable material that can withstand the media to be filtered, the applied pressure, such as up to about 5 bar or higher, the temperature span needed, such as from about 5° C. to about 55° C. as well as the medias used for cleaning the filtration unit. Also, the choice of material must foresee thermal expansion and rigidity of the unit and be sustainable to pressure and vibration. Preferred execution is a vessel in stainless steel, polycarbonate or polypropylene, and filtration plates in molded plastic such as polypropylene and for specific purposes mounted with a polymeric membrane used as a fine filter, microfilter or ultrafilter. Alternatively, the filter-plates may be manufactured from ceramic or polymeric materials which in themselves are porous or semipermeable. All materials are readily accessible in food grade versions on the market.

Definitions

The term "vibrating filter-plate assembly device" as used herein refers to the vibration of the filter-plate assembly device during filtration operation to create a dynamic cross-flow filtration or dynamic shear-enhanced filtration. The vibrating motion of the device of the invention increases permeate flux or membrane selectivity or both.

The term "vibrating motion" as used herein means movement (vibrating movement) of all of the filter surface in relation to the surrounding liquid with a frequency. Thus, the inertia of the liquid overcomes the drag of the surface resistance created when the filter plate surface vibrates relative to the liquid.

The term "permeate" is used for the media that has passed through the filter.

The term "retentate" relates to the media to be filtered. Virtually any liquid media can be filtered or separated using the device of the invention including the most demanding media with high viscosity and high solids content. Examples of advantageous uses of the vibrating device of the invention are fractionating milk into whey, milk fats and caseins, removing germs from liquids, removing pulp from juice, separating oil from a water phase, and up-concentration of species, such as peptides, polypeptides, enzymes, proteins or high molecular weight substances or microorganisms such as yeasts or *E. coli* in a liquid.

The term "feed" is also used herein for the media stream to be filtered.

The term "fine filtration" applies to filtration through slits or holes in the filter-plates of 5 to 50 μm, whereas the term "microfiltration" applies to particle sizes between a few hundredths of micrometers and tens of micrometers and is carried out at low differential pressure from just above zero to a few bar. Fine filtration is often used as safety filter for process equipment. Microfiltration is for example used for sterile filtration of milk. The term "ultrafiltration" is for example used for separating large organic molecules from mineral molecules or small organic molecules and in the ultrafiltration process a higher differential pressure of 1-15 bar may be needed.

The term "concentrate" as used herein shall mean retentate, e.g., such as a retentate that has been concentrated through dead-end or batch filtration.

The terms "flexible volume chamber", "gas cushion chamber", and "air cushion chamber" are used interchangeably herein and define a gas filled chamber being an integrated feature of the vibrating filter-plate assembly device of the invention, wherein gas or gaseous mixtures can be subjected to flexible pressures or volumes, e.g. such that the volume of the chamber is flexible or has the function of a cushion.

When filters are used in a cross-flow configuration, the media to be filtered is pumped at a speed of about 0.5 to 7 m/s, such as 2 to 5 m/s, across the surface of the filter to optimize turbulence at the filter surface. Thus, keeping solids from building up and depositing on the filter and keeping the boundary layer above the filter surface as small as possible, hereby keeping the filter openings free and functional for a longer time in operation.

Figure 1:
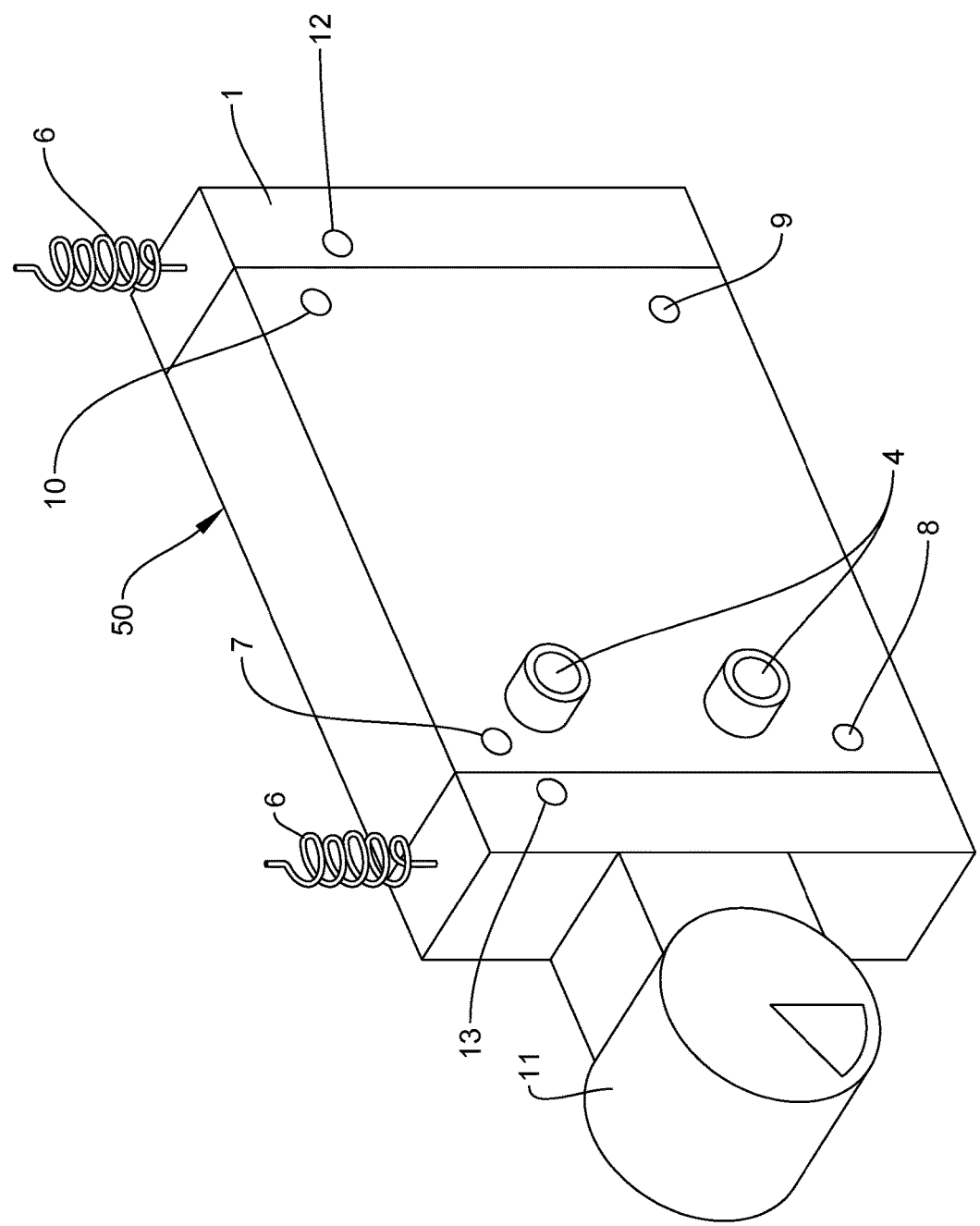
FIG. 1 is a perspective view of a vibrating filter-plate assembly device.

Other features and advantages of the invention is disclosed in the following description, with reference to the accompanying drawings wherein.

DETAILED DESCRIPTION OF THE INVENTION

An embodiment of the invention relates to the vibrating device (50) wherein the vessel housing (1) comprises one or more flexible gaskets (16, 17), said one or more flexible gaskets (16, 17) being adapted to separate the volume of the vessel pressure chamber (5) and the volume of the one or more flexible volume chambers (14, 15). Advantages of using flexible gaskets are, i.a., that with a simple flat gasket the liquid is sealed, while at the same time an air chamber is formed.

An embodiment of the invention relates to the vibrating device (50) wherein the one or more flexible volume chambers (14, 15) are formed as gas filled balloons. An advantage of using the gas filled flexible balloons is the provision of an alternative design for the housing.

An embodiment of the invention relates to the vibrating device (50) as described above, wherein the gas inlets (12, 13) to the vessel housing (1) comprises one or more pressure valves adapted to control the pressure in the one or more flexible volume chambers (14, 15), preferably the pressure in the one or more flexible volume chambers (14, 15) is pressure balanced with the retentate or media to be filtered in the vessel. An advantage is that the volumes of the air cushion chambers are flexible giving room for the liquid vibrating motion relative to the filter-plates.

An embodiment of the invention relates to the vibrating device (50) wherein the vessel housing (1) comprises a through hole adapted for a passage of the one or more permeate exits (4) from the vessel pressure chamber (5) through the vessel housing (1), where said through hole structurally fixes the filter-plate assembly rigidly in the vessel pressure chamber (5) while allowing for drainage of permeate from the filter-plate assembly (2) outside the vessel housing (1).

The pressure chamber (5) or retentate chamber for use in the vibrating device of the invention is made by rigid materials, metals such as steel, polymers such as clear polycarbonate or PVC, composite or ceramic materials or other rigid materials.

The vibration motor can be any device that can create an oscillating motion of the vibration filter unit. The vibration motor can as examples be an air pressure driven piston vibrator that is mounted on the unit, moving a weight in one direction, where by a resulting force will move the vessel in the opposite direction. Same function can be obtained mounting by unbalanced rotating wheels, electrical pistons and other inertia moving mounted devices. The motion can also be achieved by connecting the housing to an external vibration device such as any form of piston moving device.

The vibration frequency provided by the motor may be adjusted to ensure that the media to be filtered is essentially stationary while the filter-plate assembly is vibrating leading to optimized turbulent conditions at the filter-plate or membrane surface. In general, the higher media viscosity the higher vibration frequency may be needed. The motor may be driven by electricity, pneumatically, or by a gear wheel assembly, or by a toothed belt, or by a V-belt, or the like or a combination thereof. This can be obtained, such as in the below working example by a vibration with an amplitude of 3 mm and a frequency of 15 Hz.

This filter-plate assembly comprises a plurality of plastic molded planar rectangular filter-plates (3) and one or more permeate exits (4), said filter-plates comprises a first and a second rigid surface, said surfaces comprise perforations (31), said surfaces enclosing a volume, said volume constitute one or more permeate channels (39), whereby said perforations (31) are fluidly connected to said one or more permeate exit (4) through said permeate channels (39), and where the filter-plates comprises a protrusion, said protrusions of said plurality of filter-plates combined forms said permeate exits (4) from the filter-plate assembly.

A further embodiment of the invention relates to the vibrating device (50) as described above, wherein the vibrating device (50) comprises two or more vessel housings (1), said two or more vessel housings (1) are connected and structurally adapted to balance out vibrations and to avoid external vibration, such as by the use of dual crank shaft and piston connections for two vessel housings etc.

A further embodiment of the invention relates to the vibrating device (50) as described above, wherein said vibrating device (50) comprises a back-mix connection (8), said back-mix connection (8) being adapted such that the retentate to be filtered can be homogenized through one or more back-mix connections (8) for moving retentate from one area of the vessel chamber (5) to another area of the vessel chamber (5). In a further embodiment of the invention homogenization of the retentate can be optimized by utilizing connection (8) in combination with connection (10) and or connection (7) in combination with connection (9) for the back-mixing.

A further embodiment of the invention relates to the vibrating device (50) as described above, wherein the vibrating device (50) comprises at least one flexible support (6), where the vessel housing (1) is supported by said at least one flexible support (6) allowing vibrating motion of the vessel housing (1), where said at least one flexible suspension (6) can be guiding the vibration motion and further stabilizes the vibrating device.

A further embodiment of the invention relates to the vibrating device (50) as described above, wherein said vibration motor (11) is adapted to provide vibrating motion of a linear or circular nature or a combination of both. An advantage of providing a combination of linear and circular vibration motion is freedom of design of the vibrating motor.

An advantageous embodiment is so designed that the vibration motor or a counter weight element (11) is mounted on the vibrating device (50) so that the vibration motion is outbalanced on the flexible supports (6) against external forces. The unbalance in the vibration motor can be such as a rotating motor with an unbalanced weight wheel, a solenoid or a pneumatically driven piston device.

A further embodiment of the invention relates to the vibrating device (50) as described above, wherein the flexible volume chambers (14, 15) in the vibrating device (50) are connected via the gas inlet pressure valves (12, 13) to a gas pressurized feed tank (19) adapted for media or retentate to be filtered, said gas pressure pushing the feed to the vessel chamber (5) said gas pressure balancing retentate pressure in the flexible volume chambers (14, 15) and in the vessel chamber (5). An advantage of this embodiment is the provision of a simple means of equalizing air pressure in the flexible volume chambers to that of the fluid pressure in the vessel chamber.

A further embodiment of the invention relates to the vibrating device (50) as described above, wherein the filter areas of the rigid filter plates (3) are covered by an additional filter sheet (21). This embodiment may be advantageously used when wanting to obtain a finer filtration than that of the base filter plate.

In an embodiment, the one or more of said filter-plates (3) comprises two half filter-plates (32, 33), said half filter-plates are bonded together at the periphery of the filter-plates, and being identical in shape. The filter-plates may comprise additional filter sheets (21) positioned and bonded adjacent to said perforated surface of the filter-plates.

In an embodiment, the one or more permeate exits (4) extends perpendicular to the plane defined by the extent of said filter-plates (3), and wherein the filter-plate comprises bonding points (38) for bonding two adjacent filter-plates, said bonding points together with the protruding exits (4) defining the distance between two juxtaposed filter-plates, and the filter-plate assembly (2) forms a rigid singular assembly through fusing of the bonding points and protruding exits.

In an embodiment, the filter-plate assembly (2) comprises actuation means for mechanical actuation of the filter-plate assembly in a plane parallel to the extent of the filter-plates (3).

Figure 2:
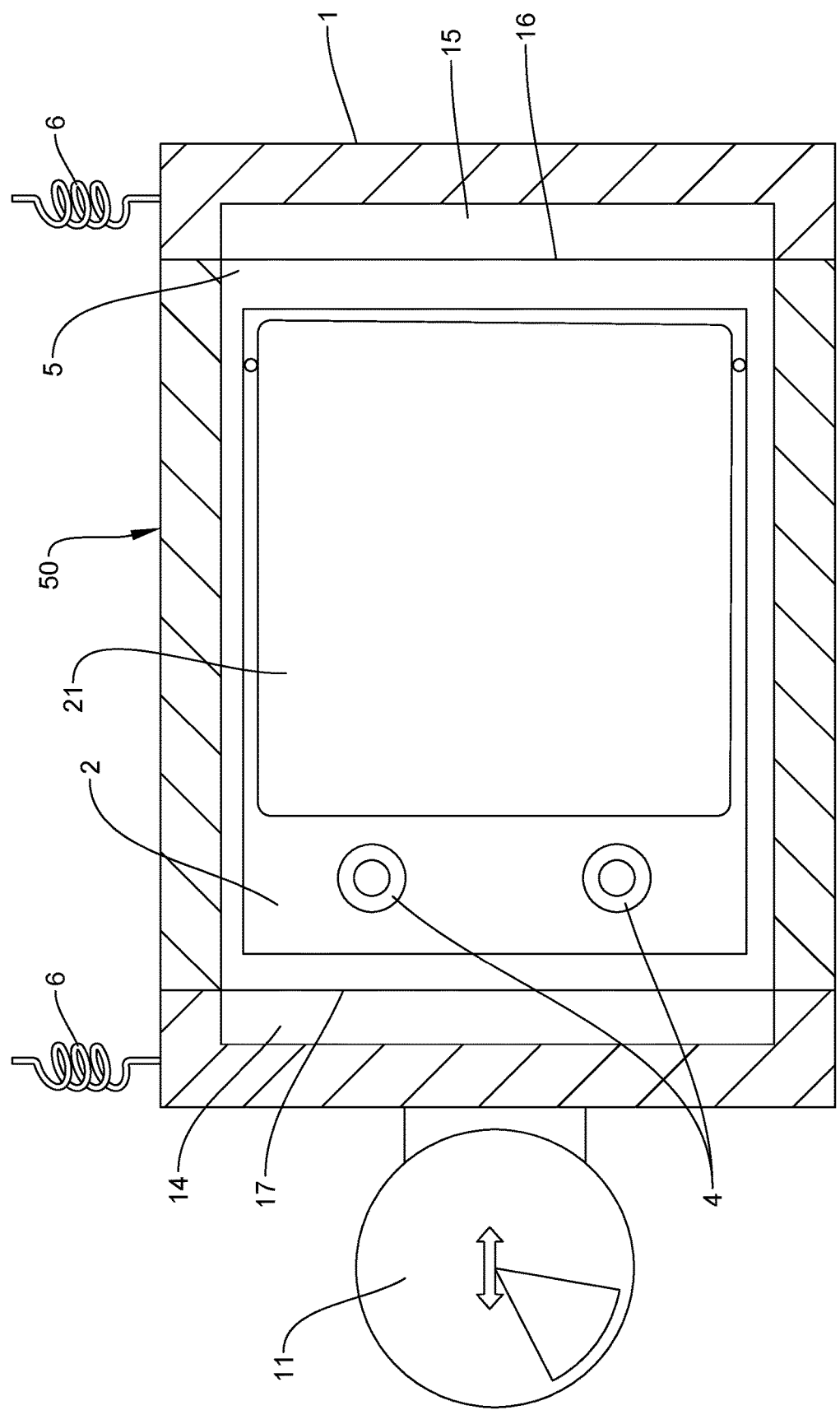
FIG. 2 is a cross-sectional view of a vibrating filter-plate assembly device.
Figure 4:
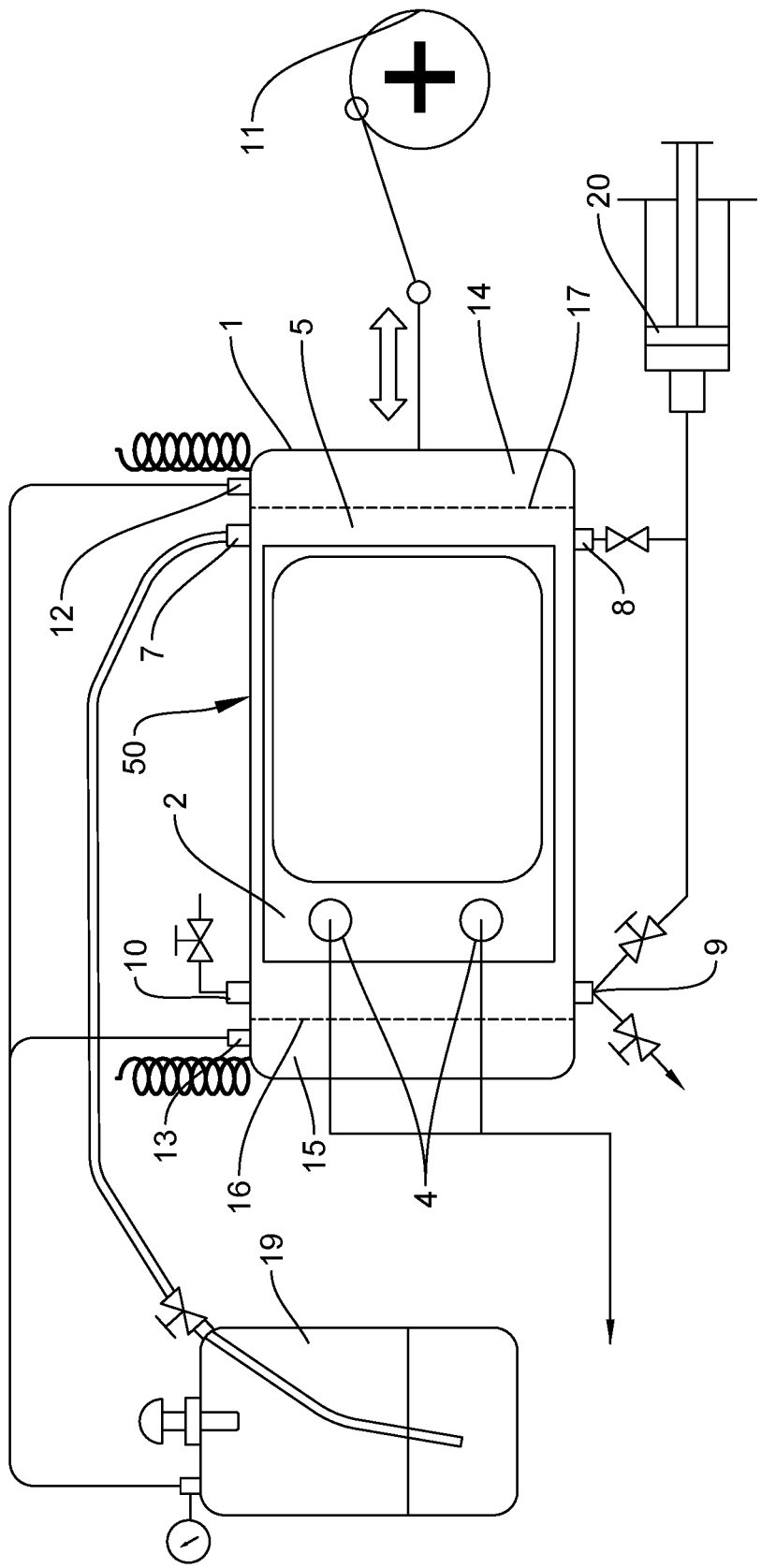
FIG. 4 is a functional view with the device connected to peripherals for operation.

The flexible volume chambers can be formed as individual balloons in the retentate chamber (5), however, for improved hygiene and as shown in FIGS. 2 and 4 the gas filled flexible volume chambers (14, 15) are in certain embodiments formed as sealed off parts of the vessel, where a flexible gasket separates the cushion volume from the retentate volume. The cushion chambers are optimally placed on opposite sides or ends of the filter-plate assembly and in the direction of motion, when the vessel housing is vibrated to allow for optimal movement of retentate in relation to the planar surfaces of the plates in the filter-plate assembly.

In an embodiment, the filter-plate assembly (2) comprises a plurality of filter-plates (3) and a housing, where the filter-plates are situated parallel juxtaposed having the perforated surface facing the perforated surface of an adjacent filter-plate, said housing encompassing said plurality of filter-plates forming a square or rectangular entry area in fluid connection with the inlet or entry (7) for a media to be filtered and a similar retentate exit area in fluid connection with outlet (or exit) (9) for drainage.

In an embodiment the filter-plate assembly comprises a plurality of plastic molded planar square or rectangular filter-plates (32, 33) and one or more permeate exits (4), the filter-plates (32, 33) comprises a first and a second rigid surface, the surfaces comprise perforations (31), the surfaces enclosing a volume, the volume constitute one or more permeate channels (39), whereby the perforations (31) are fluidly connected to the one or more permeate exit (4) through the permeate channels (39). The filter-plates for use in the invention are preferably of rectangular or square geometry or the like which is an advantage for optimal fit into a box shaped vessel pressure chamber.

Figure 5:
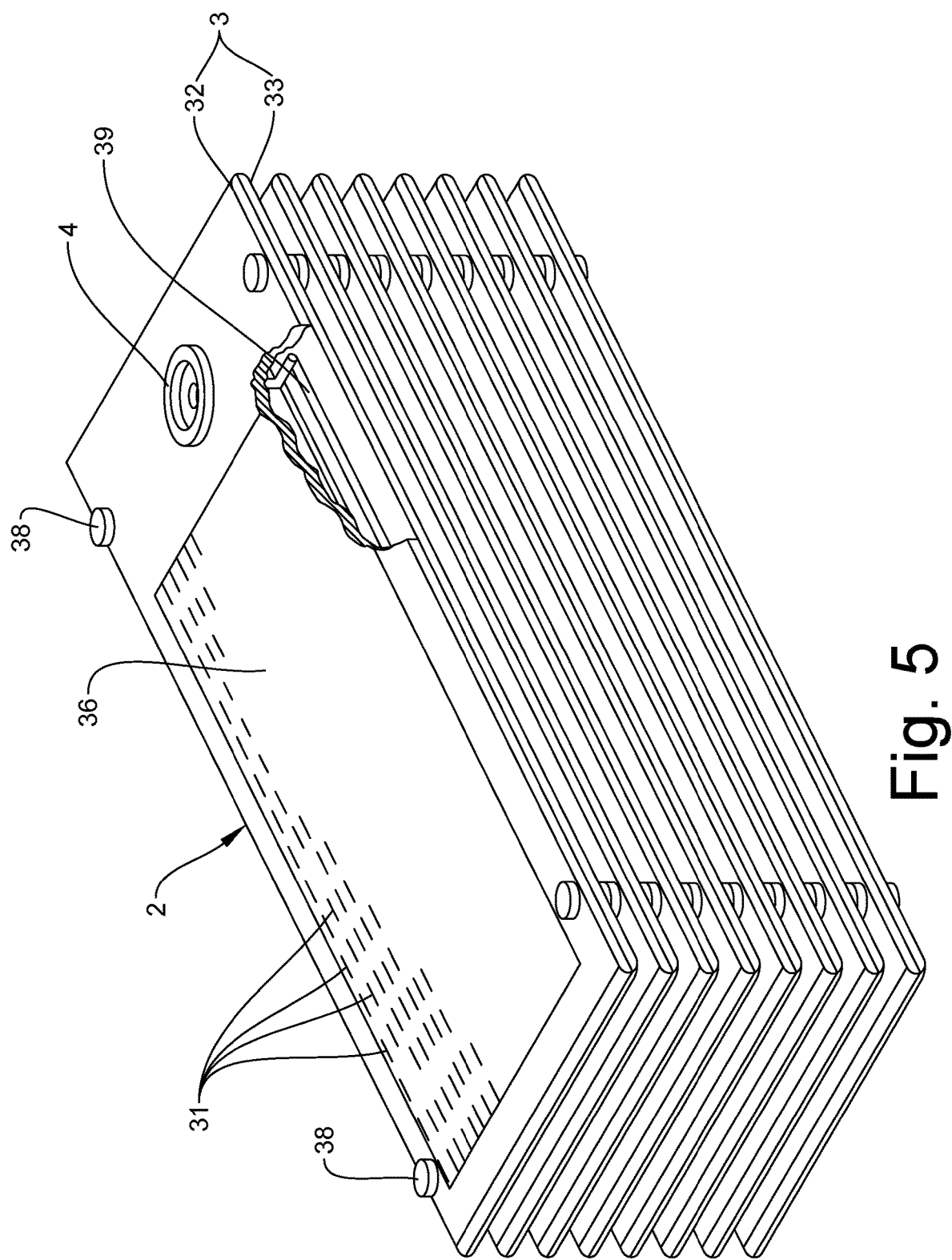
FIG. 5 is a perspective view of an example of a filter-plate assembly with details.

The filter-plate assembly, such as is illustrated in FIG. 5, comprises a plurality of planar, rigid filter-plates and one or more perpendicular permeate exits. These permeate exits extend through the vessel housing wall through a sealing permeate connection, hereby mechanically fixing the plate assembly rigidly in the vessel. The vessel is vibrated in the same plane as the plates with a vibration motor with amplitude of typically 2-25 mm at frequency between 5 and 50 Hz.

The vessel includes one or more air cushions formed as flexible volume chambers or balloons, typically two, one in each side of the vibrating direction and on each side of the filter-plate assembly, allowing the media to be filtered to move relatively to the filter surface as the filter-plate assembly is moved with the vibrating vessel and the air cushions are squeezed or expanded to allow for the relative movement of the retentate.

The vibrating motor is typically a motor driven eccentric weight or an eccentric piston connection or a pneumatic or electromagnetic piston, but other means are also available.

In many embodiments of the invention the vessel has a robust design that can sustain the vibration as well as the required internal pressure, as the internal pressure corresponds to the trans membrane pressure, given that permeate can flow unrestricted from the permeate exit(s).

The vessel is typically mounted on or hanging from springs or elastic mounts allowing for the vibrating motion. The vessel design is typically adjusted to tightly enclose the filter-plate assembly to avoid larger dead volumes in the vessel.

In an embodiment of the invention the vibrating filter-plate assembly device (50) is used for filtrating liquids with high solids content, and/or with high viscosity, and/or with high sanitary demand, and/or for filtrating liquids exhibiting a combination thereof. The vibrating device is particularly advantageous for such high energy requiring filtration processes.

In an embodiment of the invention the vibrating filter-plate assembly device (50) is used for filtering of oils and/or lubricants, such as mineral oils and emulsions, where an energy efficient particle separation and/or filtration can be obtained.

In an embodiment of the invention the vibrating filter-plate assembly device (50) is used for sterile filtering of liquids, such as water for consumption. The energy saving features of the invention are particularly advantageous for filtration treatment of very large volumes.

DETAILED DESCRIPTION OF THE FIGURES

FIG. 1 illustrates one embodiment of an external view of the vibrating filter-plate assembly device (50) of the invention. In the illustrated embodiment, the two permeate exits (4), the media or retentate inlet or entry connection (7), opening useful for, e.g., de-aeration or back-mix inlet connection (10), retentate outlet connection (9) and optional retentate back-mix connection (8) of the filtration device is shown on the same side of the device where the gas inlets (12, 13) connect to the flexible volume chambers in the form of two separate gas cushion chambers. A vibration motor (11) is illustrated as mounted in one end of the device, and the device itself comprises two flexible supports (6) in the form of suspension springs allowing for axial movement of the device. The vibrating motion provided by the motor (11) affects the device (50) to be moved in a direction which is essentially parallel to the extent of the planar surfaces of the internal filter-plates (not shown in FIG. 1, cf. (3) of FIG. 3), and the vibration is essentially perpendicular to the longitudinal axes of the gas cushion chambers provided at each end of the vessel having the gas inlets (12) and (13), respectively, and being separated by flexible gasket sheets from the pressure chamber for the retentate inside of the device (not indicated in FIG. 1 but shown as (5) in FIG. 2, where the gasket sheets are shown as (16) and (17). The vibrating motion will keep the filter surface of the filter-plates free and clean during the filtration process.

FIG. 2 shows a cross-sectional view of one embodiment of the vibrating device (50) of the invention. In the illustrated embodiment, the filter-plate assembly (2) with permeate exits (4) is placed in the vessel pressure chamber (5) for the retentate. The air cushions are established through flexible gasket sheets (16, 17) that separate the retentate in the vessel pressure chamber (5) from the flexible volume chambers (14, 15) or gas cushion chambers with flexible and impermeable seals (16, 17). Both the vessel pressure chamber (5) and the gas-filled flexible volume chambers (14, 15) are formed as part of the vessel housing (1). The vibration motor (11) is illustrated as mounted in one end of the device, and the device further comprises flexible supports (6), such as springs for suspension or support, allowing for axial movement of the device, and in the given embodiment the movement would be right to left to right given the positions of the flexible gaskets in relation to the filter-plate assembly (2), thus providing an essentially perpendicular direction of vibration relative to the longitudinal axis of the flexible volume chambers. The filter-plate assembly (2) comprises one or more hollow filter-plates having a filtration area or a membrane area (21), is the filter-plate assembly being fixed inside the vessel housing via the permeate exit connections (4) as these go through the sidewall of the vessel housing (1) to the outside of the device (50). The filter-plate assembly is held in place with hollow screws that can at the same time fix the filter-plate assembly mechanically in the device and, being hollow, lead the collected permeate out through the protruding permeate exits (4).

Figure 3:
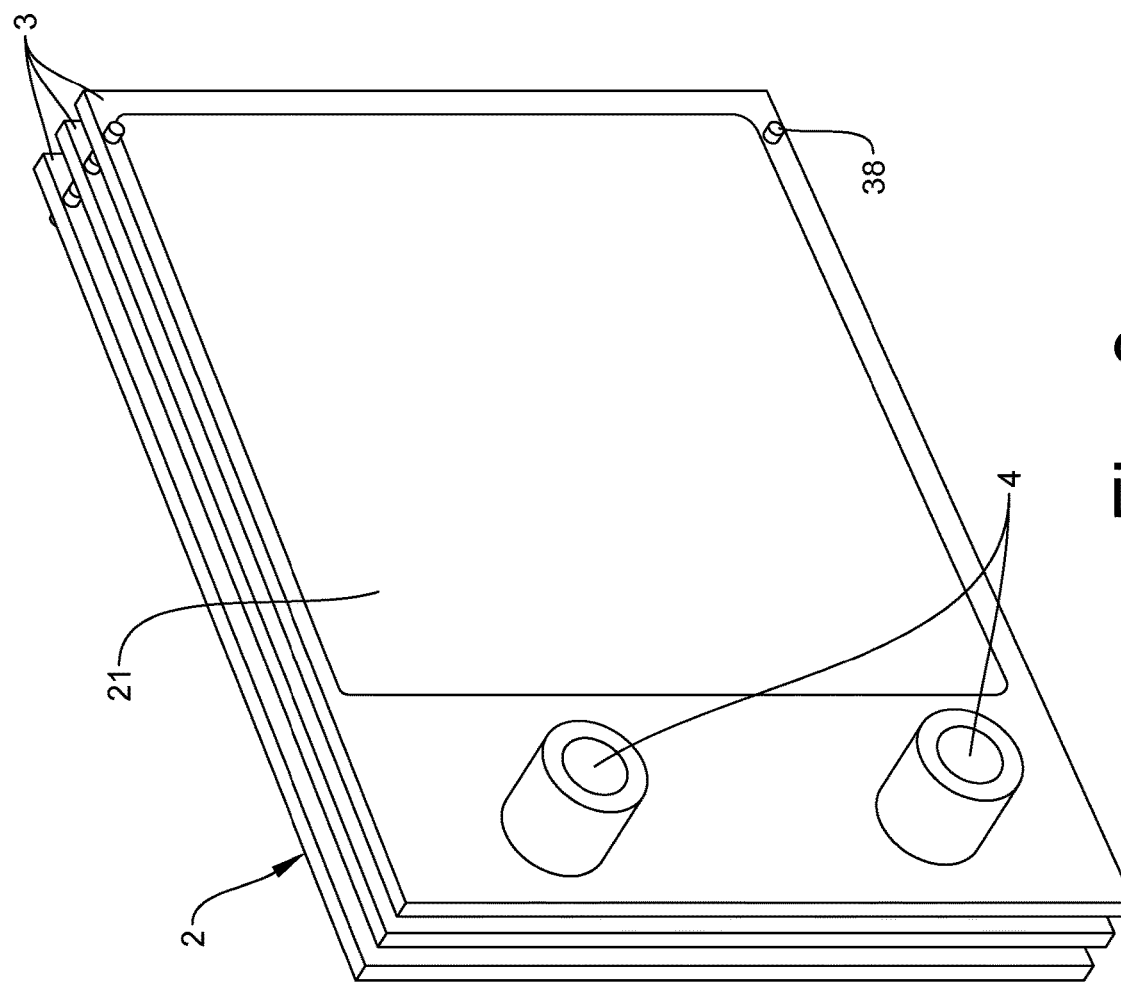
FIG. 3 is a perspective view of the filter-plate assembly with permeate exits.

FIG. 3 illustrates a filter-plate assembly (2) that comprises a stack of 3 hollow filter-plates (3). The surface of each rigid, flat, filter-plate is covered by a fine filter membrane (21) on both sides. In the embodiment, the 3 filter-plates (3) are connected at a distance defined by the bonding points (38), only one shown, and cylinder like connections at the permeate exits (4). The permeate exits can be fused together or in other ways connecting, forming a permeate manifold from the three, hollow filter-plates (3) connecting to the permeate exits (4). The permeate exits lead permeate out of the vessel housing (1).

The filter-plate assembly (2) forms an open, rigid, free flow structure allowing for vibration motion of the filter-plate assembly in the plane of the filter-plates (3) while the free access allows for movement of the media in relation to the filter-plates.

FIG. 4 is an example of functional arrangement of the filter-plate assembly device connected to peripherals for operation. The filter-plate assembly (2) is placed in the pressure withstanding vessel pressure chamber (5). The vessel housing (1) comprises a see-through panel allowing inspection of filter surface inside the vessel housing (1). The retentate stream enters in one corner through inlet or entry for retentate (7) and exits in the opposite corner through exit for concentrate (9). The device is suspended in springs allowing for the vibration motor (11) to impose the axial movement of the device in a direction parallel to the surface of the filter-plates as shown with the two-way arrow. In the shown embodiment the feed is pumped from the feed tank (19) by gas being pumped into the feed tank by a pump, and the pressured gas forces the feed into the retentate chamber (5) via the feed or retentate entry (7). The same gas that pumps the feed is connected to the cushion chambers (14, 15) whereby the pressure is essentially the same in the retentate chamber (5) and the cushion chambers, allowing for a movement of the retentate in relation to the chamber during the axial, in plane movement of the device (50) as the air cushions (14, 15) are squeezed or expanded. The feed pressure is adapted to the application and for microfiltration, and the pressure is generally below 1.5 bar, while for ultrafiltration the pressure is typically between 2 and 4 bar. While initially filling the device, the retentate chamber (5) can be de-aerated via a high placed de-aeration connection (10). In the shown embodiment the size of the feed tank can be adapted to needs or filled with more feed during a pause in the filtration process. In a not shown embodiment, the feed is pumped into the device by a suitable feed pump and gas in the flexible volume chambers (14, 15) can be entered via entry gas inlets, such as valve connections (12, 13) and balanced with the vessel pressure by separate means. Permeate exits the device through connections (4) while new feed is entered at (7). Retentate can be drained continuously from exit (9) or the feed can be left concentrated in the chamber (5). In FIG. 4 the vibrating device (50) comprises a mixing pump (20) as illustrated, which is connected to the retentate outlet (9) and to a retentate back-mix connection (8), and this pump can be used during operation to homogenize the retentate, or to ensure mixing during cleaning of the device.

FIG. 5 illustrates one embodiment of a filter-plate assembly formed by a fused stack of filter-plates (3) where each filter-plate is made by bonding two half plates (32, 33). In the illustrated embodiment, the one permeate exit (4) of the Filter-plate assembly is at the end of the filtration area (6) and the filtration area is shown without a fine filtering element or membrane covering the numerous slit shaped perforations (31). As indicated, a number of channels (9) connect to the permeate exit inside the filter-plate and the perforations lead to these channels. The permeate exit from the assembly can be sealed off at one side of the stack, depending on need for exit area. The slit or gap between filter-plates, form the free entry area for media to be filtered.

It goes without saying that different modifications may be made to the examples described, without departing from the scope of the invention.

It shall be noted that the overall design hereby provides up-scaling possibilities to have many square meters of filtration area in one compact filtration unit. Thus, in an embodiment of the present invention the vibrating filter-plate assembly device consists of a stack of two or more coupled pressure chambers (5) each having a filter-plate assembly (e. g. each having 33 filter-plates with a combined filter or membrane area of 2.5 m$^2$) in the vessel housing, and where the device is provided with at least one flexible volume chamber at the end of the first and the last pressure chamber (5) in the stack and is connected to a vibrating motor. In this configuration a filtration area of up to at least 20 m$^2$ can be obtained. Alternatively, up-scaling may be achieved by coupling two or more vessel housings.

All parts can be of food and pharmaceutical grade material with traceable origins, making the Filtration Unit suitable for human food consumables and the likes. The materials used are preferably of a plastic material that can be reused by re-melting or burned as a clean fossil-like fuel.

The parts of the unit can be produced by 3-D printing or sintering or by other means.

Working Examples

Example 1. Dead-end orange juice ultrafiltration with and without vibration using a vibrating filter-plate assembly device prototype having a filter-plate assembly of 5 plates having the same configuration as shown in FIG. 3 and a vibration motor (Kolbenvibrator NTK 18AL, NetterVibration, Mainz-Kastel, Germany) and a functional arrangement as shown in FIG. 4.

A new 0.35 m² filter-plate assembly with a 10 kDa fluoropolymer membrane (GR82, Alfa Laval, Nakskov) was mounted in the pressure chamber and the device was assembled. The device was checked for leaks with water at 2 bar.

A 30 min lye wash (1.25% liquid cleaning agent for membranes Divos 120 CL, sold by Diversey, Nivaa, Denmark) at pH 11 and 50° C. was performed at 0.5 bar pressure and the vibration motor at 15 Hz frequency with partly opened retentate outlets. The device was drained and flushed thoroughly with tap water.

The device was drained, and tap water was used as the media in a dead-end filtration at 1.5 bar with the vibration motor at 15 Hz and closed retentate outlets. The average flux was measured after 10 min to 43.8 LMH (liters/m²/hour) over a 1 min period.

The device was drained and orange juice (diluted from concentrate, manufactured by Rynkeby, Denmark) was used as the media in a dead-end filtration at 1.5 bar with the vibration motor at 15 Hz and closed retentate outlet. The time was registered at each 50 mL of permeate produced and the average flux between the measuring points was calculated. The results are listed in Table 1 below from where it can be seen that 1000 mL of permeate was reached after 1960 seconds.

TABLE 1

| Time (sec) | Permeate Volume (mL) | Permeate Flux* (LMH) |
|---|---|---|
| 0 | 0 | — |
| 40 | 50 | 12.9 |
| 88 | 100 | 10.7 |
| 142 | 150 | 9.5 |
| 206 | 200 | 8.0 |
| 270 | 250 | 8.0 |
| 344 | 300 | 6.9 |
| 418 | 350 | 6.9 |
| 506 | 400 | 5.8 |
| 600 | 450 | 5.5 |
| 695 | 500 | 5.4 |
| 787 | 550 | 5.6 |
| 886 | 600 | 5.2 |
| 1010 | 650 | 4.1 |
| 1134 | 700 | 4.1 |
| 1260 | 750 | 4.1 |
| 1389 | 800 | 4.0 |
| 1524 | 850 | 3.8 |
| 1655 | 900 | 3.9 |
| 1794 | 950 | 3.7 |
| 1960 | 1000 | 3.1 |

*Average Flux between the last and the current measuring point

The device was drained, and tap water was used as the media in a continuous filtration at 0.5 bar with the vibration motor at 15 Hz and partly opened retentate outlet for 15 min. A 30 min lye wash (1.25% liquid cleaning agent for membranes Divos 120 CL, sold by Diversey, Nivaa, Denmark) pH 11 at 50° C. was performed at 0.5 bar pressure and the vibration motor at 15 Hz was performed with partly opened retentate outlets. The device was drained and flushed thoroughly with tap water.

The device was drained, and tap water was used as the media in a dead-end filtration at 1.5 bar with the vibration motor at 15 Hz and closed retentate outlets. The average flux was measured after 10 min to 43.8 LMH over a 1 min period.

The device was drained and the orange juice was used as the media in a dead-end filtration at 1.5 bar with the vibration motor stopped and closed retentate outlet. The time was registered at each 50 mL of permeate produced and the average flux between the measuring points was calculated. The results are listed in Table 2 from where it can be seen that 850 mL of permeate was reached after 3181 seconds making the process considerably slower and less efficient.

TABLE 2

| Time (sec) | Permeate Volume (ml) | Permeate Flux* (LMH) |
|---|---|---|
| 0 | 0 | — |
| 63 | 50 | 8.2 |
| 146 | 100 | 6.2 |
| 242 | 150 | 5.4 |
| 369 | 200 | 4.0 |
| 505 | 250 | 3.8 |
| 664 | 300 | 3.2 |
| 825 | 350 | 3.2 |
| 1016 | 400 | 2.7 |
| 1210 | 450 | 2.7 |
| 1423 | 500 | 2.4 |
| 1627 | 550 | 2.5 |
| 1860 | 600 | 2.2 |
| 2090 | 650 | 2.2 |
| 2359 | 700 | 1.9 |
| 2606 | 750 | 2.1 |
| 2885 | 800 | 1.8 |
| 3181 | 850 | 1.7 |

*Average Flux between the last and the current measuring point

The unit was drained, and water was used as the media in a continuous filtration at 0.5 bar with the vibration motor at 15 Hz and partly opened retentate outlet for 15 min. A 30 min lye wash (1.25% liquid cleaning agent for membranes Divos 120 CL, sold by Diversey, Nivaa, Denmark) pH 11 at 50° C. was performed at 0.5 bar pressure and the vibration motor at 15 Hz was performed with partly opened retentate outlets. The unit was drained and flushed thoroughly with water.

The unit was drained, and water was used as the media in a dead-end filtration at 1.5 bar with the vibration motor at 15 Hz and closed retentate outlets. The average flux was measured after 10 min to 29.1 LMH over a 1 min period. The unit was left overnight with water. A 30 min lye wash (1.25% liquid cleaning agent for membranes Divos 120 CL, sold by Diversey, Nivaa, Denmark) pH at 50° C. was performed at 0.5 bar pressure and the vibration motor at 15 Hz was performed with partly opened retentate outlets. The unit was drained and flushed thoroughly with water.

The unit was drained, and water was used as the media in a dead-end filtration at 1.5 bar with the vibration motor at 15 Hz and closed retentate outlets. The average flux was measured after 10 min to 42.8 LMH over a 1 min period.

Conclusion: A 15 Hz vibration made the orange juice filtration faster and, in addition, the resulting fouling was more reversible by lye wash.

The invention claimed is:

1. A vibrating filter-plate assembly device for liquid filtration comprising
   a vessel housing including a filter-plate assembly and one or more flexible volume chamber(s) being filled with gas,
   where the one or more flexible volume chamber(s) is/are adapted to expand and/or compress volume(s) of the one or more flexible volume chamber(s) inside the vessel housing allowing liquid in a vessel chamber to move across a surface of filter-plates of said filter-plate assembly when said vessel housing comprising said filter-plate assembly is subjected to a vibrating motion, wherein the vibrating filter-plate assembly device includes at least one flexible support or suspension, where the vessel housing is supported by said at least one flexible support or suspension allowing the vibrating motion of the vessel housing.

2. The vibrating filter-plate assembly device according to claim 1 being adapted for vibration of the filter-plate assembly device, and the filter-plate assembly device being adapted for vibration driven filtration, said filter-plates comprising a plurality of rigid, planar filter-plates comprising one or more permeate channels and one or more permeate exits, where said one or more permeate exits extend perpendicular to the filter-plate assembly device and through said vessel housing being adapted for permeate to exit the vessel housing, and said filter-plate assembly device is rigidly mounted inside said vessel chamber;

said vibrating filter-plate assembly device comprises at least one feed inlet adapted for a retentate stream to enter the vessel housing and at least one retentate outlet adapted for a retentate stream to exit the vessel housing, and said vibrating filter-plate assembly device comprises a vibration motor being adapted to provide the vibrating motion to the vessel housing, wherein said vibrating filter-plate assembly device comprises the one or more flexible volume chambers being adapted to expand and/or compress the volumes of the chambers inside the vessel housing allowing the retentate in the vessel chamber to move in parallel relative to the surface of said filter-plates, when said vessel housing comprising said filter-plate assembly is subjected to the vibrating motion.

3. The vibrating filter-plate assembly device according to claim 2, wherein the vessel housing comprises one or more flexible gaskets, said one or more flexible gaskets being adapted to separate the volume of the vessel chamber and the volume of the one or more flexible volume chambers.

4. The vibrating filter-plate assembly device according to claim 2, wherein the one or more flexible volume chambers are formed as gas filled balloons.

5. The vibrating filter-plate assembly device according to claim 2, wherein the vessel housing comprises one or more gas inlets adapted to control a pressure in the one or more flexible volume chambers, which is pressure balanced with a retentate or media to be filtered in the vessel chamber.

6. The vibrating filter-plate assembly device according to claim 5, wherein the one or more flexible volume chambers in the vibrating device are connected via the gas inlets to a gas pressurized feed tank adapted for media or retentate to be filtered, a gas pressure pushing feed to the vessel chamber, said gas pressure balancing retentate pressure in the one or more flexible volume chambers and in the vessel chamber.

7. The vibrating filter-plate assembly device according to claim 2, wherein a direction of the vibrating motion is essentially perpendicular to the longitudinal axes of the one or more flexible volume chambers.

8. The vibrating filter-plate assembly device according to claim 2, wherein the vessel housing comprises a through hole adapted for a passage of said one or more permeate exits from the vessel pressure chamber through the vessel housing, where said through hole structurally fixes the filter plate assembly rigidly in the vessel pressure chamber while allowing for drainage of permeate from the filter plate assembly outside the vessel housing.

9. The vibrating filter-plate assembly device according to claim 1, comprising two or more vessel housings, said two or more vessel housings are connected and structurally adapted to balance out the vibrations.

10. The vibrating filter-plate assembly device according to claim 2, further comprising at least one back-mix connection for homogenization of the retentate to be filtered by leading the retentate from the back-mix connection to another area of the vessel chamber.

11. The vibrating filter-plate assembly device according to claim 2, wherein said vibration motor is adapted to provide vibrating motion of a linear or circular nature or a combination of both.

12. The vibrating filter-plate assembly device according to claim 1, wherein filter areas of the filter-plates are covered by an additional filter sheet.

13. The vibrating filter-plate assembly according to claim 2, wherein the vibrating motion of the filter-plates and the pressure vessel relative to media being filtered is achieved through oscillating gas feeds asynchronically in relation to the one or more flexible volume chambers.

14. Use of the vibrating filter-plate assembly device according to claim 1 for vibration driven dead-end filtration operation, where media is concentrated in a retentate chamber and discharged.

15. Use of the vibrating filter-plate assembly device according to claim 1 for intermediately vibration driven filtration operation, where media is concentrated in a retentate chamber.

16. Use of the vibrating filter-plate assembly device according to claim 1 for polypeptides, enzymes, proteins, yeast, or *E. coli* cells, in a liquid.

* * * * *